(12) United States Patent
Hirabayashi et al.

(10) Patent No.: US 7,536,923 B2
(45) Date of Patent: May 26, 2009

(54) FORCE SENSOR CHIP

(75) Inventors: Yusuke Hirabayashi, Wako (JP);
Nobuhiro Sakurai, Wako (JP); Takeshi Ohsato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 11/797,173

(22) Filed: May 1, 2007

(65) Prior Publication Data

US 2007/0266797 A1   Nov. 22, 2007

(30) Foreign Application Priority Data

May 2, 2006   (JP)   ............... P2006-128384

(51) Int. Cl.
    *G01L 1/22*   (2006.01)
(52) U.S. Cl. ............... 73/862.044; 73/862.041
(58) Field of Classification Search ............ 73/862.041, 73/862.044, 862.045
    See application file for complete search history.

(56) References Cited

U.S. PATENT DOCUMENTS

| | | | | |
|---|---|---|---|---|
| 4,448,083 A * | 5/1984 | Hayashi | ............... | 73/862.042 |
| 5,263,375 A * | 11/1993 | Okada | ............... | 73/862.042 |
| 5,889,214 A * | 3/1999 | Kang et al. | ............ | 73/862.044 |
| 6,823,744 B2 * | 11/2004 | Ohsato et al. | .......... | 73/862.041 |
| 6,951,142 B2 * | 10/2005 | Ohsato et al. | .......... | 73/862.041 |
| 7,231,802 B2 * | 6/2007 | Okada | ................. | 73/1.38 |
| 2003/0140713 A1 * | 7/2003 | Ohsato et al. | ........ | 73/862.041 |
| 2005/0081645 A1 | 4/2005 | Ohsato et al. | | |
| 2006/0086190 A1 | 4/2006 | Ohsato et al. | | |
| 2007/0006668 A1 * | 1/2007 | Hirabayashi et al. | ... | 73/862.541 |
| 2008/0034897 A1 * | 2/2008 | Ohsato et al. | .......... | 73/862.629 |
| 2008/0047366 A1 * | 2/2008 | Kuriyama et al. | ..... | 73/862.627 |
| 2008/0053247 A1 * | 3/2008 | Sakurai et al. | ......... | 73/862.041 |
| 2008/0066562 A1 * | 3/2008 | Sakurai et al. | ......... | 73/862.044 |

FOREIGN PATENT DOCUMENTS

| | | |
|---|---|---|
| EP | 1 327 870 A2 | 7/2003 |
| JP | 11-333765 A | 12/1999 |
| JP | 2001-264198 A | 9/2001 |
| JP | 2003-207405 A | 7/2003 |

* cited by examiner

*Primary Examiner*—Harshad Patel
*Assistant Examiner*—Freddie Kirkland, III
(74) *Attorney, Agent, or Firm*—Birch, Stewart, Kolasch & Birch, LLP

(57) ABSTRACT

A force sensor chip having a multiaxial force sensing function is disclosed. The force sensor chip comprises a base member having an operating part provided with an external force application area, a supporting part for supporting the operating part, connecting parts for connecting the operating part and the supporting part, and strain resistance elements disposed in the connecting parts or within boundaries between the connecting parts and the operating part. The base member has a thin area formed with a small thickness, and the boundaries of the thin area are disposed in the supporting part and operating part.

12 Claims, 7 Drawing Sheets

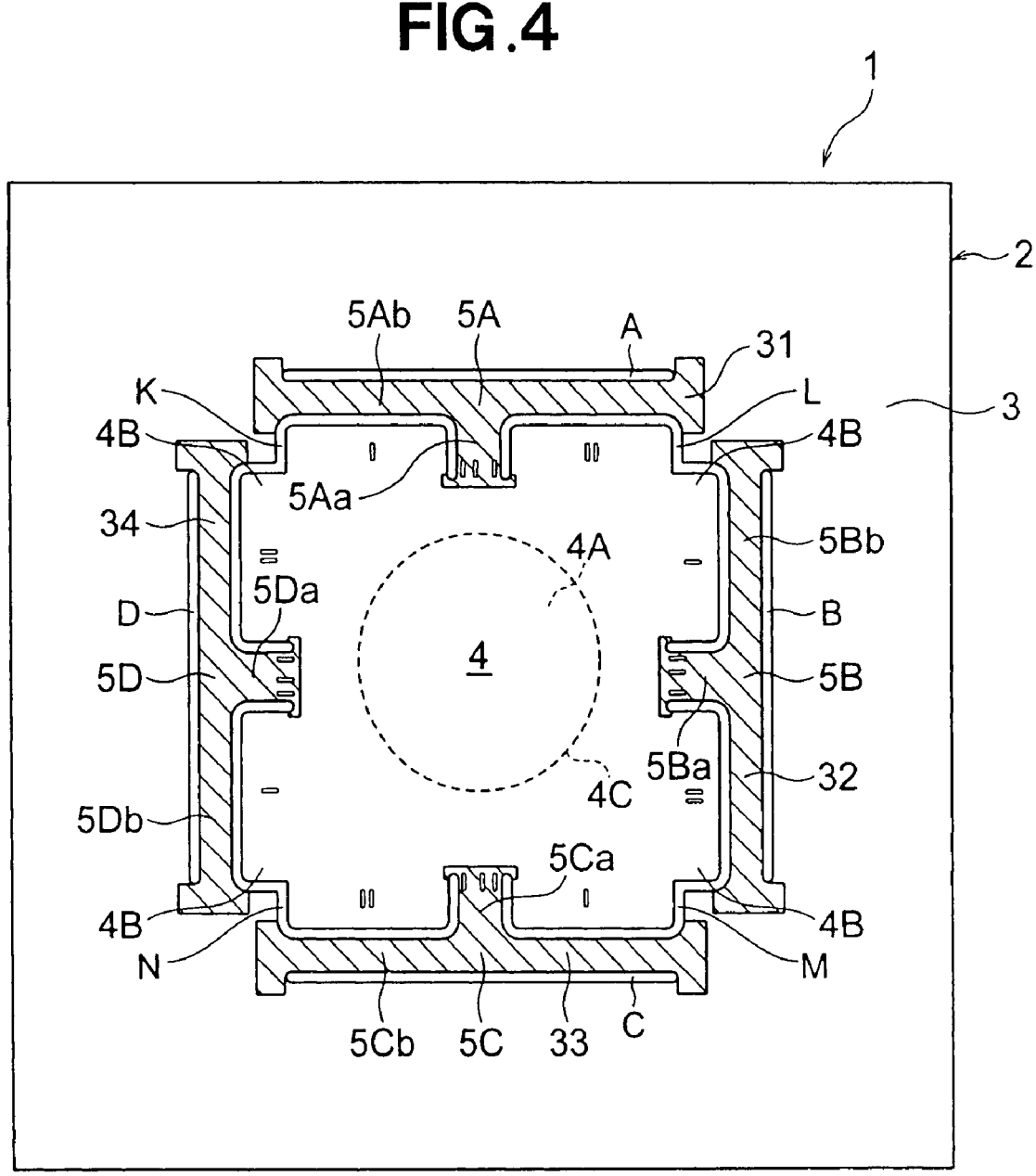

FORCE SENSOR CHIP

FIELD OF THE INVENTION

The present invention relates to a force sensor chip and, more particularly, to a force sensor chip which has a plurality of strain resistance elements formed on the surface of a semiconductor substrate by using semiconductor manufacturing technology, and which is suitable for a six-axis force sensor or other device used as a compact force sensor in an industrial robot or the like.

BACKGROUND OF THE INVENTION

In automated industrial machines such as machine tools, industrial robots, and the like, forces are applied to workpieces, and the forces act from the outside because of the manner in which these machines operate. In this case, the forces and moments applied to the machines from the outside must be detected, and a control program that corresponds to these forces and moments must be performed. To ensure that a control program that corresponds to these forces and moments is carried out with a high degree of precision, the externally applied forces and moments must be accurately detected.

In view of this situation, various types of force sensors have been proposed in the past. When classified based on the detection scheme, force sensors are usually divided into elastic force sensors and equilibrium force sensors. Elastic force sensors measure a force on the basis of the amount of deformation proportional to the external force. Equilibrium force sensors measure a force by balancing this force with a known force.

Also known are force sensors whose structure is based on the principle that a plurality of strain resistance elements is installed in parts of a strain-generating body which undergoes elastic deformation in accordance with an external force. When an external force is applied to the strain-generating body of the force sensor, electrical signals corresponding to the degree of deformation of the strain-generating body are output from the plurality of strain resistance elements. Forces that have two or more components and are applied to the strain-generating body can be detected on the basis of these electrical signals. The measurement of the force generated by the force sensor can be calculated on the basis of these electrical signals.

Six-axis force sensors constitute a known class of force sensors. Such six-axis force sensors are a class of elastic force sensors that comprise a plurality of strain resistance elements in parts of a strain-generating body. Six-axis sensors divide an external force into force components (forces: Fx, Fy, Fz) in the respective axial directions of three axes (X axis, Y axis, Z axis) of an orthogonal coordinate system, and into moment components (moments: Mx, My, Mz) about the respective axes, and detect the force as six-axis components.

The present inventors previously proposed a six-axis force sensor having a novel construction (see JP 2003-207405 A1). This six-axis force sensor can solve the problem of interference from other axes that prevents the respective components (forces and moments) of an external force applied to a strain-generating body from being resolved with good precision. In this six-axis sensor, a plurality of strain resistance elements is integrally assembled in a specified arrangement pattern on parts of a strain-generating body on a semiconductor substrate by using a semiconductor manufacturing process. The six-axis sensor is constructed from a supporting part which comprises a plate-form semiconductor substrate that has a substantially square plane shape, and which supports an operating part as the peripheral part of the substrate; an operating part having a substantially square plane shape which is positioned in the central part; and connecting parts which connect each of the four sides of the square operating part with the corresponding portions of the supporting part. The strain resistance elements are installed in the boundary parts between the sides of the square operating part and the connecting parts. This six-axis force sensor solves the problem of interference from other axes by improving the configuration of the parts of the strain-generating body and the arrangement pattern of the plurality of strain resistance elements, and optimizing the arrangement pattern of the plurality of strain resistance elements.

JP 2001-264198 A1 may also be cited as a prior art document relating to the invention of the present application. In the multiaxial force sensor disclosed in JP 2001-264198 A1, only some of the connecting parts of the sensor chip are made thinner by electrochemical etching in order to increase the amount of strain of the sensor chip as the sensor chip becomes more compact, and the strain detection sensitivity is increased.

In the six-axis force sensor described in JP 2003-207405 A1, there is no mention of any improvement of the detection balance between the axial forces when the planar shape of the semiconductor substrate that forms the sensor chip is made even more compact. In actuality, the thickness of the semiconductor substrate must also be reduced by the same ratio as the plane surface area in order to make the planar shape of the semiconductor substrate more compact while maintaining a favorable detection balance between the respective axial forces. The reason for this is that even in cases where the external forces applied in the X, Y and Z axial directions are equal, a difference is generated between the amount of deformation of the chip caused by the external forces applied in the X and Y axial directions and the amount of deformation of the chip caused by the external force applied in the Z axial direction if the planar shape alone is made more compact without varying the thickness, and it is therefore impossible to maintain the detection balance. However, there is no description of reducing the thickness of the semiconductor substrate from the standpoint of maintaining a favorable detection balance. Furthermore, the following problem arises in the semiconductor process when an attempt is made to reduce the entire chip to the desired thinness from the start. Since the silicon wafer that is used to manufacture the chip is inherently thin as such in comparison with the surface area of the wafer, a further reduction in the thickness leads to a danger of warping and cracking of the wafer during the process. However, leaving the thickness unchanged relative to the surface area of the chip makes it difficult to increase the chip sensitivity even if flexible parts are formed.

On the other hand, in the multiaxial force sensor described in JP 2001-264198 A1, it is indicated that the thickness of some of the connecting parts of the sensor chip is reduced for the purpose of heightening the strain detection sensitivity of the sensor chip. Here, the rigidity of the connecting parts is lowered to achieve flexibility and make the chip more compact by forming the connecting parts into thin parts using a semiconductor process (electrochemical etching) rather than mechanical working. However, in this multiaxial force sensor, the problem of damage caused by the concentration of stress arises when boundaries of the thin areas (boundaries of thick parts and thin parts) are formed in the connecting parts during reduction of the thickness of the sensor chip. Furthermore, forming boundaries of the thin areas in the connecting parts causes a variation to be generated in the amount of strain detected by the respective strain resistance elements. There is therefore a possibility that a difference will arise between the amount of strain intended in the design and the amount of strain that is actually generated. In other words, an unnecessary concentration of stress tends to occur, and unexpected noise is superimposed on the amount of detected strain as a result of boundaries of the thin areas being formed in the connecting parts. Consequently, individual differences are generated between the respective axes, and hence between the respective chips.

SUMMARY OF THE INVENTION

It is an object of the present invention to provide, in light of the above problems, a force sensor chip in which a favorable detection balance can be maintained between the respective axial forces even when the planar shape is made compact, in which the concentration of stress in the connecting parts by applied external forces can be prevented to avoid chip damage, and in which the connecting parts can be sufficiently flexed so that the detection sensitivity can be increased while making it less likely that design errors will occur in the amounts of strain detected by the respective strain detection elements.

According to an aspect of the present invention, there is provided a force sensor chip having a multiaxial force sensing function, the force sensor chip comprising: a base member having an operating part provided with an external force application area; a supporting part for supporting the operating part; connecting parts for connecting the operating part and the supporting part; and strain resistance elements disposed in the connecting parts or within boundaries between the connecting parts and the operating part, wherein the base member has a thin area formed with a small thickness, and the boundaries of the thin area are disposed in the supporting part and the operating part.

The thin area formed in the base member is formed to include the areas of the connecting parts. As a result, when the planar shape of the chip as such is made compact, the overall degree of deformation of the connecting parts is increased by the presence of the thin area, and the detection balance between the respective axial forces can be maintained as the chip is made more compact.

Preferably, the thin area has boundaries disposed in an area of a predetermined range extending from outside end portions of the connecting parts to an end portion of the base member, and in an area of a predetermined range extending from an end portion of the external force application area to inside end portions of the connecting parts.

Desirably, the thin area is formed to include as a whole each of the connecting parts.

Preferably, the thin area includes as a whole each of the connecting parts, and is formed corresponding to the connecting parts.

In a preferred form, the base member is bored to have openings so that it is functionally separated into the supporting part, the operating part and the connecting parts.

It is preferable that the openings be long slots.

It is desirable that each of the connecting parts have a bridge part provided with an area of high rigidity, and an elastic part provided with an area of low rigidity.

Preferably, the thin area has boundaries that are disposed inside an area of a predetermined range extending from an end portion of the base member to end portions of the elastic parts, and inside an area of a predetermined range extending from an end portion of the external force application area to end portions of the bridge parts.

Desirably, the thin area is an annular area that surrounds the external force application area of the operating part.

Preferably, the thin area is formed on a back surface of the base member.

Desirably, the base member is a semiconductor substrate, and the thin area is formed by a dry etching treatment.

The thin area formed in the base member is formed to include the areas in which the connecting parts are formed, and the degree of deformation of the connecting parts can therefore be increased. Accordingly, even if the chip is made compact in the planar direction, a favorable detection balance can be maintained between the respective axial forces as the chip is made more compact. In particular, since the boundary between the thin part of the thin area and the thick parts of other areas is formed in the supporting part and the operating part, a favorable detection balance can be maintained between the respective axial forces without affecting the connecting parts.

If the boundary of the thin area is formed in the supporting part and operating part as described above, a state of concentrated stress in the connecting parts can be avoided, and damage to the base member, i.e., to the chip, can be prevented.

Since the degree of deformation of the connecting parts overall can be increased by forming the thin area, strain can be effectively generated in the parts where deformation of the connecting parts is generated, and the detection sensitivity can be increased.

BRIEF DESCRIPTION OF THE DRAWINGS

Certain preferred embodiments of the present invention will be described in detail below, by way of example only, with reference to the accompanying drawings, in which:

FIG. 4 is a view similar to FIG. 2, showing a force sensor chip according to a second embodiment of the present invention;

DETAILED DESCRIPTION OF THE PREFERRED EMBODIMENTS

A first embodiment of the force sensor chip of the present invention will be described with reference to FIGS. 1 through 3. In this embodiment, an example of a six-axis force sensor chip is described as a force sensor chip. The force sensor chip of the present invention is not limited to a six-axis force sensor chip.

Figure 1:
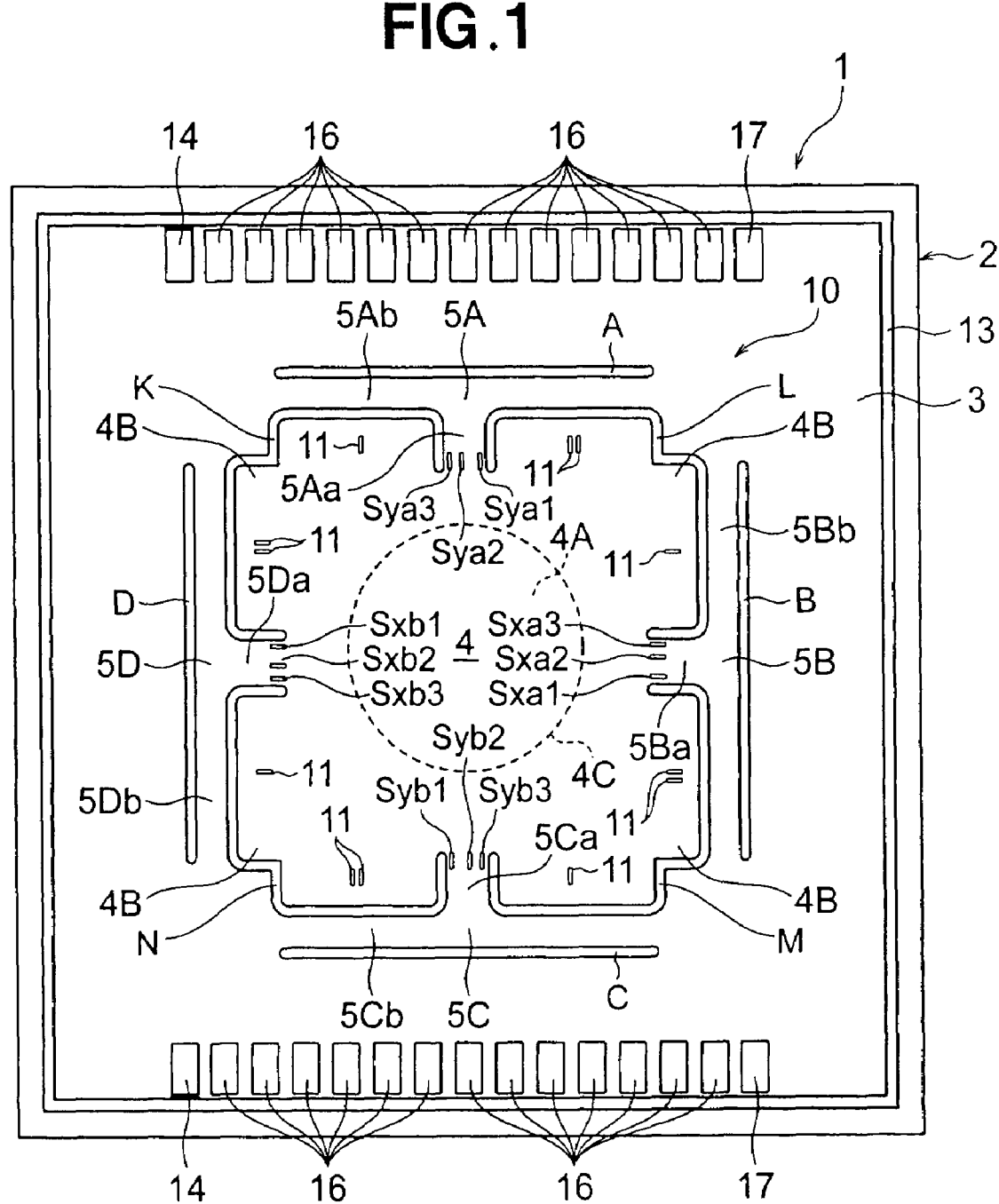
FIG. 1 is a plan view showing a force sensor chip according to a first embodiment of the present invention.

FIG. 1 is a plan view showing the front surface of the force sensor chip. In the force sensor chip of FIG. 1, all of the strain resistance elements and temperature compensation resistance elements show a pattern comprising a plurality of holes and electrode pads.

In FIG. 1, the six-axis force sensor chip 1 of the present embodiment is formed using a semiconductor substrate which preferably has a square planar shape. For example, the length of one side of this square semiconductor substrate is 5.5 mm. The substrate is not limited to a semiconductor substrate. The six-axis force sensor chip 1 has a plate-form shape based on the semiconductor substrate.

In the six-axis force sensor chip 1, in cases where a semiconductor device is formed on the substrate, the square semiconductor substrate is provided with a planar shape, specified holes are formed, and the substrate itself is processed by applying semiconductor manufacturing process technology (treatments such as patterning, etching, ion implantation, P-CVD, sputtering, RIE, and the like) to one surface (front surface), and the chip is manufactured by forming a film in a specified area of the front surface of the semiconductor substrate.

Thus, the six-axis sensor chip 1 of the present embodiment is formed as a semiconductor sensor device.

In the six-axis sensor chip 1, the functional part for detecting six-axis components as a six-axis force sensor is formed by 12 strain resistance elements (or piezo-resistance elements, hereafter referred to as "resistance elements," meaning strain resistance elements) Sxa1 through Sxa3, Sxb1 through Sxb3, Sya1 through Sya3, and Syb1 through Syb3 composed of active layers (or thermal diffusion layers) formed by ion implantation in the front surface of a semiconductor substrate 2. The total of 12 strain resistance elements are disposed as sets of three elements each (Sxa1, Sxa2, Sxa3), (Sxb1, Sxb2, Sxb3), (Sya1, Sya2, Sya3), and (Syb1, Syb2, Syb3) along the area adjacent to the edge of the boundary with the operating part 4 in four connecting parts 5A through 5D having a below-described inverted T shape (or T shape).

Furthermore, temperature compensation resistance elements 11 composed of active layers (thermal diffusion layers) are separately formed in the six-axis force sensor chip 1 in positions corresponding to the 12 resistance elements Sxa1 through Sxa3, Sxb1 through Sxb3, Sya1 through Sya3, and Syb1 through Syb3.

As is shown in FIG. 1, the semiconductor substrate 2 has holes or openings A, B, C, D, K, L, M, and N formed by boring so that these holes pass through in the direction of thickness of the plate member. The six-axis force sensor chip 1 is functionally separated into the supporting part, the operating part, and the connecting parts by the holes A, B, C, D, K, L, M, and N.

The holes A, B, C, D, K, L, M, and N all have a slit-form shape that has a relatively narrow width. The holes A, B, C, and D have a substantially rectilinear slit shape, and the holes K, L, M, and N have a slit shape resembling the letter L.

The semiconductor substrate 2 that forms the six-axis force sensor chip 1 is constructed from an operating part 4 which has a planar shape resembling a square shape positioned in the center, a supporting part 3 which has a substantially square ring shape in a position surrounding this operating part 4, and four connecting parts 5A, 5B, 5C, and 5D having a T shape which are positioned between the operating part 4 and supporting part 3, and which connect both of these parts in positions corresponding to the respective parts of the four sides. The operating part 4 is formed by the holes K, L, M, and N. The four T-shaped connecting parts 5A, 5B, 5C, and 5D are formed between the holes A, B, C, and D and the holes K, L, M, and N.

Furthermore, in cases where the strain resistance elements are disposed on the connecting parts, the arrangement is not necessarily limited to locations where maximum stress is generated in the connecting parts. The strain resistance elements are disposed by taking into account various other conditions, such as the formation process, wiring route, and the like.

In the semiconductor substrate 2 having the above configuration, for example, when the surrounding supporting part 3 is assembled with the six-axis force sensor unit, this supporting part 3 is joined to a support seat (e.g., the chip seat 303 shown in FIG. 7 described later).

Silicon and glass, or glass and a metal can usually be joined by anodic joining, but direct anodic joining between silicon and a metal is not possible. Accordingly, the support seat and a metal part that transmits external forces, such as a connecting rod or the like, are jointed via a glass part. This point will be explained in detail later.

Furthermore, for example, when the operating part 4 is assembled with the six-axis force sensor unit, and external forces, loads, or the like (hereafter referred to as "external loads") are transmitted via a connecting rod or the like (e.g., the transmitting part 104 shown in FIG. 7 described later), the operating part 4 is the part that directly receives the action of these external forces. The operating part 4 is ordinarily constructed so as to receive external forces in the central portion thereof. Furthermore, when the operating part 4 receives an external force and undergoes a change in position, the connecting parts 5A, 5B, 5C, and 5D undergo considerable deformation in conjunction with the change in position.

The operating part 4 is formed from a central part (external force application area) 4A to which external forces are applied or input, and is also formed from four corner parts 4B corresponding to the four corners positioned around the central part 4A. The circle 4C indicated by a broken line is a connection area where a connecting rod that transmits external forces and the like is connected. For example, the diameter of the circle 4C is 1.6 mm. The outer edge parts of the four corner parts 4B in the operating part 4 are formed as free ends by the holes K, L, M, and N. Accordingly, the areas adjacent to the free ends of the four corner parts 4B are non-deformation areas in which no deformation occurs in the parts themselves even in cases where an external force is applied to the central part 4A.

In the operating part 4, the central part 4A is a part where external forces are applied or input. As is shown in FIG. 2, the four surrounding connecting parts 5A through 5D are substantially T-shaped bridges and have a bridge part 5Aa and elastic part 5Ab, a bridge part 5Ba and elastic part 5Bb, a bridge part 5Ca and elastic part 5Cb, and a bridge part 5Da and elastic part 5Db, respectively. The elastic parts 5Ab, 5Bb, 5Cb, and 5Db of the connecting parts 5A through 5D are connected to the supporting part 3 at both end portions in the longitudinal direction in the areas on the inside of the holes A, B, C, and D, respectively. In each of the bridge parts 5Aa, 5Ba, 5Ca, and 5Da of the connecting parts 5A through 5D, one end portion in the longitudinal direction (the inside end portion) is connected to a part corresponding to one side of the operating part 4, and the other end portion (outside end portion) is connected to the corresponding elastic part.

In order to disperse the stress caused by external forces applied to the operating part 4 and to provide strength against applied external forces, the peripheries of the boundaries between the operating part 4 and the bridge parts 5Aa, 5Ba, 5Ca, and 5Da and elastic parts 5Ab, 5Bb, 5Cb, and 5Db are worked, preferably rounded, into a circular arc shape and connected. The shapes of the holes A through D and K through N are not limited to the shapes shown in the present embodiment. The holes A through D and K through N are formed by taking into account the size of the six-axis force sensor chip 1, the number of strain resistance elements, the detectable stress range, and the like so that strain is most conspicuously generated in the parts of the 12 strain resistance elements Sxa1 through Sxa3, Sxb1 through Sxb3, Sya1 through Sya3, and Syb1 through Syb3 and not generated in the positions of the temperature compensation resistance elements 11, and so that the temperature conditions are the same in the 12 strain resistance elements. For example, the linear lengths of the end portions of the holes K through N (the parts of the holes extending from the bridge parts 5Aa through 5Da to the respective temperature compensation elements) may be made longer than the lengths shown in FIGS. 1 and 2.

In the structural example shown in FIG. 1, the connecting parts 5A through 5D are formed substantially with a T shape (as T beams) by the holes A, B, C, D, K, L, M, and N formed as through-holes in the semiconductor substrate 2. However, as long as these parts provide the required elastic function, the parts may be formed with some other shape, such as a Y shape or the like.

In FIG. 1, for example, the resistance elements Sya1, Sya2, Sya3, and the like are formed adjacent to the boundary between the operating part 4 and the bridge part 5Aa in the connecting part 5A. Specifically, on the front surface of the connecting part 5A, stress is generated in accordance with external forces applied to the operating part 4. Accordingly, these elements are formed so that the elements are disposed in parts where strain is most conspicuously generated. Furthermore, the resistance elements Sya1, Sya2, and Sya3 are lined up in the direction of width of the bridge part 5Aa, and are formed so that these elements are spaced at equal intervals, with the longitudinal directions of the elements parallel to the direction of the longitudinal axis of the bridge part 5Aa. The central resistance elements Sya2, Sxa2, Syb2, and Sxb2 are disposed on the center line in the longitudinal direction of the respective bridge parts.

Similar to the resistance elements Sya1 through Sya3 described above, the other resistance elements Syb1 through Syb3, resistance elements Sxa1 through Sxa3, and resistance elements Sxb1 through Sxb3 are formed so that these resistance elements are disposed adjacent to the boundary between the operating part 4 and bridge part 5Ca, adjacent to the boundary between the operating part 4 and bridge part 5Ba, and adjacent to the boundary between the operating part 4 and bridge part 5Da.

Substantially square annular GND (ground) wiring 13 is disposed across the required width along the respective sides around the periphery of the semiconductor substrate 2. Two electrode pads 14 are connected to the GND wiring 13.

A total of 26 signal electrode pads 16 are formed along each of a pair of opposite sides in the semiconductor substrate 2. Thirteen signal electrode pads 16 are lined up along each of these sides. Two remaining electrode pads 17 are additional electrode pads. These additional electrode pads 17 are provided in order to make the potential in the plane of the semiconductor substrate uniform by being connected to an external GND potential or bias potential. The number of additional electrode pads 17 is not limited to two, and three or more of these electrode pads may be installed. The square annular GND wiring 13 shown in FIG. 1 is merely an example; this function can be fulfilled as long as a constant potential is afforded.

In the six-axis force sensor chip 1, the 12 temperature compensation resistance elements 11 which are separately installed corresponding to each of the 12 resistance elements Sxa1 through Sxa3, Sxb1 through Sxb3, Sya1 through Sya3, and Syb1 through Syb3 are disposed on the peripheral edge parts of the four corner parts 4B, which are non-deformation areas. The resistance elements and temperature compensation resistance elements 11 are related in a one-to-one correspondence. The 12 temperature compensation resistance elements 11 are formed on the surface of the peripheral edge parts of the corner parts 4B, which have substantially the same temperature conditions as the corresponding resistance elements and do not deform even when the operating part 4 receives an external force. The results of measuring variations in the resistance of the resistance elements used for external force measurement are constantly corrected on the basis of variations in the resistance of the temperature compensation resistance elements 11 that are unaffected by external forces, so that the measurement of forces and moments unaffected by the ambient temperature is possible.

Here, one example of the method used to manufacture the six-axis force sensor chip 1 will be described. For example, boron, which is a p-type impurity, is implanted as ions into a semiconductor substrate made of n-type (100) silicon using a resistance element formation pattern formed by photolithography, and the semiconductor substrate 2 is heated so that an activation treatment of the implanted boron is performed, thus forming active layers. The resistance elements that are formed on the front surface of the semiconductor substrate 2 are the temperature compensation resistance elements 11 and the strain resistance elements Sya1 through Sya3, Syb1 through Syb3, Sxa1 through Sxa3 and Sxb1 through Sxb3. Subsequently, a silicon oxide film is formed as an inter-layer insulating film by p-CVD (plasma chemical vapor growth method).

Subsequently, a resist pattern used to form contact holes is formed, and the inter-layer insulating film in the areas where the contact holes are to be formed is removed by means of BHF (buffered hydrofluoric acid) using this resist pattern as a mask. Then, the resist pattern is removed, Al or Al—Si (an alloy of aluminum and silicon) is sputtered over the entire front surface of the semiconductor substrate 2, and a heat treatment used to form an ohmic junction is performed. This results in the formation of contacts for the active layers and contacts between the various types of electrodes and the semiconductor substrate 2.

Subsequently, a resist pattern used to form GND wiring, signal wiring, and the like is formed together with the respective electrode areas by photolithography, and patterning of the respective wiring and electrodes is performed by removing the unnecessary metal parts by wet etching. The resist pattern is then removed, and an SiN film (silicon nitride film) is formed as a passivation film by p-CVD. Subsequently, holes A, B, C, D, K, L, M, and N are formed in the semiconductor substrate 2 by RIE (reactive ion etching), and sensor chip are divided (sensor chips 1 are cut out from the wafer) by dicing. Instead of being divided by dicing, sensor chips can sometimes be cut by an etching treatment using RIE.

Next, the thin area of the six-axis force sensor chip 1 provided with the above-described structure on the front surface will be described with reference to FIGS. 2, 3A, and 3B.

Figure 2:
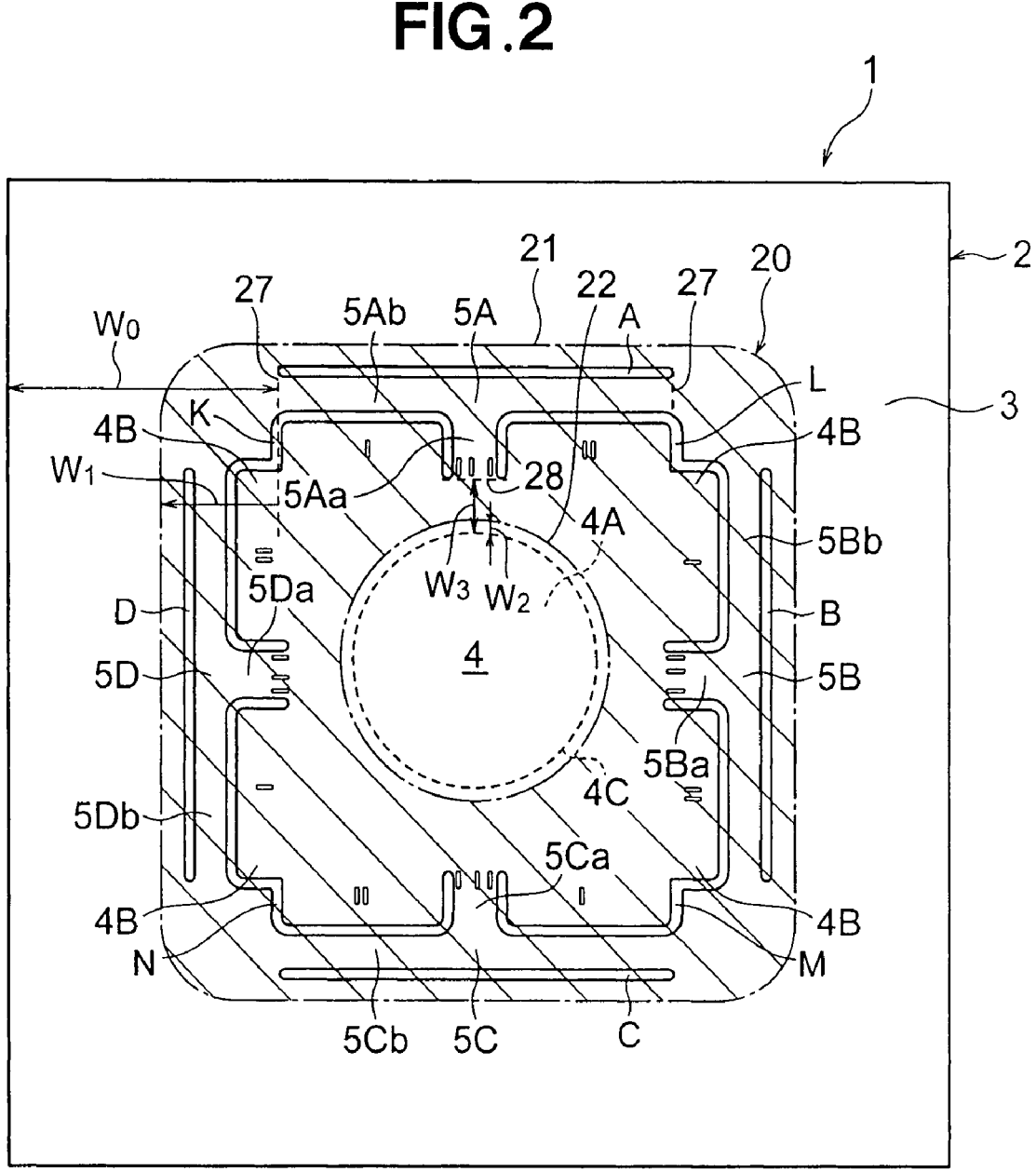
FIG. 2 is a top plan view showing in simplified manner the front surface of the semiconductor substrate of the force sensor chip according to the first embodiment of the present invention.
Figure 3A:
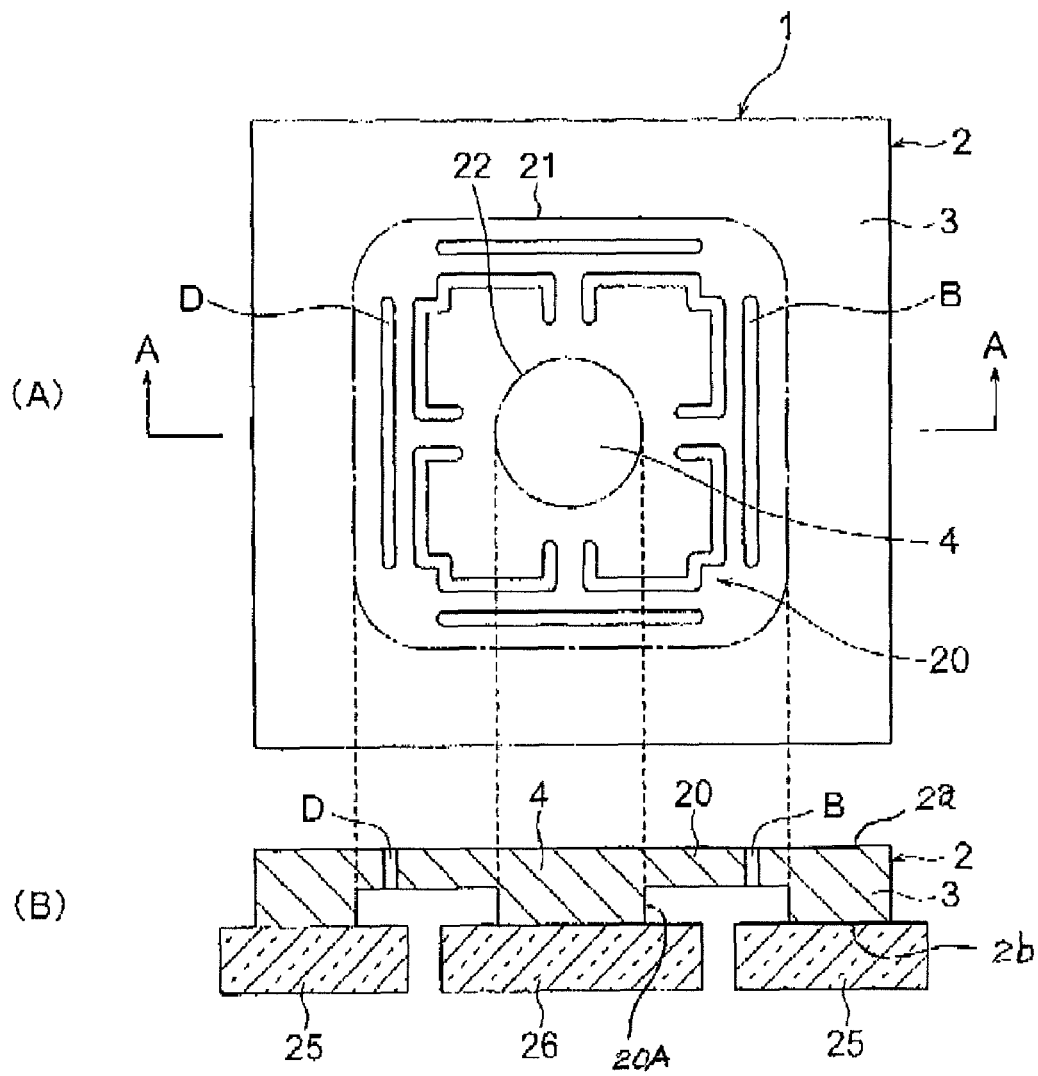
FIG. 3A is a schematic view showing the upper surface of the force sensor chip in further simplified manner and in cross section along line A-A.
Figure 3B:
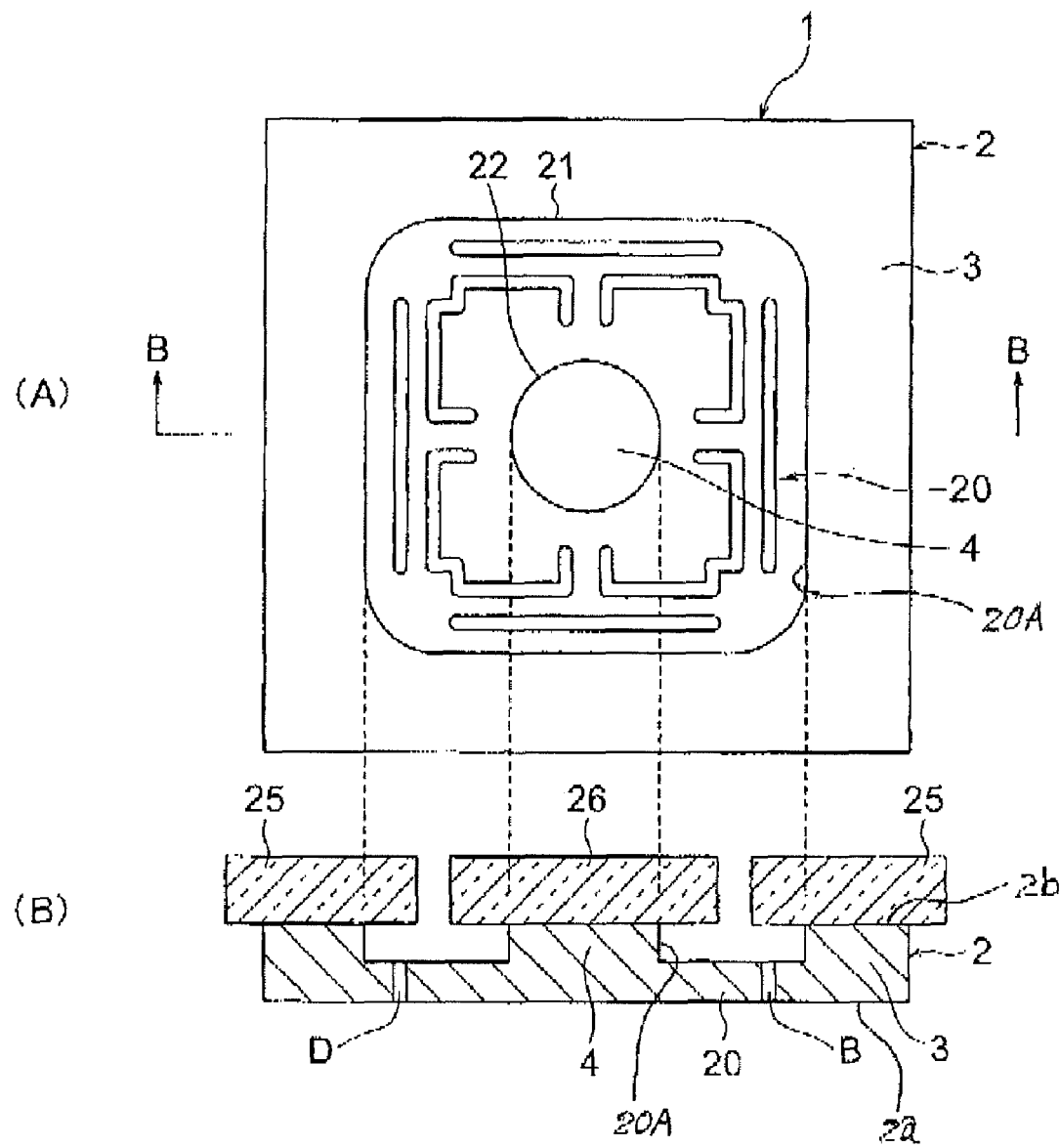
FIG. 3B is a schematic view showing the back surface of the force sensor chip in further simplified manner and in cross section along line B-B.

FIG. 2 shows the front surface of the semiconductor substrate 2 of the six-axis force sensor chip 1 in simplified form, FIG. 3A shows a plan view (A) and a cross section along line A-A (B) of the further simplified chip front surface, and FIG. 3B shows an underside view (A) and a cross section along line B-B (B) of the chip back surface. The relationship of the joining alignment of the glass parts joined to the back surface of the chip (described later) is also shown in the sectional view (B) of FIG. 3A and the sectional view (B) of FIG. 3B.

As is shown in FIG. 2, the thin area 20 is the area indicated by shading between the outside boundary 21 and inside boundary 22. As is shown in FIG. 3A (B) and FIG. 3B (B), the thin area 20 is formed as a thin part by subjecting the back surface of the semiconductor substrate 2 to dry etching or the like. The etching of the semiconductor substrate 2 is set as a step of the method used to manufacture the six-axis force sensor chip 1.

The thickness can also be reduced by wet etching, but the thin area can be formed with greater precision by using a dry etching treatment such as RIE or the like, which is superior in terms of finer processing precision.

The thin area 20 in the plan view of the chip shown in (A) of FIG. 3A and in the undersurface view of the chip shown in (B) of FIG. 3B can be clearly shown based on the correspondence relationship with the thin part shown in the sectional views of the respective figures.

As is shown in (B) of FIG. 3A, (B) of FIG. 3B, and the like, glass parts 25 and 26 are respectively joined to the thick parts of the semiconductor substrate 2 that remain as a result of the formation of the thin area 20 on the back surface of the semiconductor substrate 2, i.e., the thick parts of the supporting part 3 and operating part 4. The substrate has a top surface 2a and a bottom surface 2b. The thin area 20 is formed by a recess 20a in the bottom surface 2b. The glass part 25 is joined to the supporting part 3, and the glass part 26 is joined to the operating part 4. From the standpoint of the joining alignment described above, a design is selected so that the surface along which the supporting part 3 is joined to the glass part 25 is narrower than the surface of the glass part 25 that faces the supporting part 3. Similarly, the surface along which the operating part 4 is joined to the glass part 26 is designed wider than the surface of the glass part 26 that faces the operating part 4. In other words, from the standpoint of the joining alignment with the glass parts, the shape and area of the thin area 20 of the semiconductor substrate 2 are specifically selected.

Silicon and glass, and glass and metal can usually be joined by anodic joining, but direct anodic joining between silicon and metal is not possible. Accordingly, in the present embodiment, as is shown in FIGS. 3A and 3B, anodic joining is made possible via the respective glass parts 25 and 26 in the joint between the support seat (metal, not shown) and the supporting part 3, and in the joint between the operating part 4 and the connecting rod (metal, not shown) that transmits external forces to the operating part 4.

Furthermore, in the anodic joining treatment, it is necessary to align the glass parts 25 and 26 and the joints between the supporting part 3 and operating part 4 of the six-axis force sensor chip 1.

In the present embodiment, the thin area is made larger than in existing conventional techniques. Accordingly, the plane surface area of the thick parts of the supporting part 3 and operating part 4 can be made smaller than the plane surface area of the glass parts 25 and 26. As a result, even if the position of the sensor chip 1 is somewhat shifted during alignment, the joining surfaces of the supporting part 3 and operating part 4 originally scheduled for joining can be stipulated from the sensor chip. From the standpoint of this joining alignment, the joining surface on the back surface of the chip (the remaining parts that are not made thinner) is preferably made smaller than the joining surface of the joined glass parts. In other words, it may be said that a configuration in which the thin area is larger is preferred to provide better joining surfaces with the glass parts.

The thin area 20 in the first embodiment has an annular shape. The annular planar shape has the advantage of being able to simplify the adjustment of the alignment with the glass parts 25 and 26 is obtained. The outside boundary 21 of the annular thin area 20 is formed on the back surface of the part where the supporting part 3 is formed. The inside boundary 22 of the thin area 20 is the part that forms the operating part 4, and the boundary is formed on the back surface of the area surrounding the central part (external force application area) 4A to which external forces are applied. As a result, the thin area 20 is formed as an area that includes all of the connecting parts 5A through 5D.

Next, the position of the outside boundary part 21 and the position of the inside boundary part 22 that determine the range of the thin area 20 will be described. Here, the "distance $W_0$" and the "distance $W_3$" are defined as shown in FIG. 2. For example, the "distance $W_0$" is the distance from the outside end portion (end portion of the elastic part) 27 of the connecting part 5A to the edge of the semiconductor substrate 2. Furthermore, for example, the "distance $W_3$" is the distance from the inside end portion (end portion of the bridge part) 28 of the connecting part 5A to the external force application area 4A of the operating part 4.

In the thin area 20, the position of the outside boundary 21 formed on the supporting part 3 is between the outside end portions (boundary between the connecting part and supporting part) 27 of the respective connecting parts and the edge of the semiconductor substrate 2. In other words, forming the thin area 20 on the back surface of the semiconductor substrate 2 allows the position of the outside boundary 21 to be set in a range in which there is no loss of functionality for the supporting part 3 (i.e., in which the joining area with the external structural body is retained and no problems are created in terms of strength). The range for setting the outside boundary of the thin area can be expressed as the distance $W_1$ shown in FIG. 2. In this case, the distance $W_1$ may be set, for example, so that the condition $0<W_1<W_0\leq 0.9$ is satisfied. Here, $0<W_1$ means that the position of the outside boundary 21 faces the edge of the semiconductor substrate 2, beginning with the outside end portion 27 of the connecting part as the starting point.

The position (FIG. 15) of the inside boundary 22 formed in the operating part 4 is between the edge of the external force application area 4A and the inside end portion (boundary between the connecting part and operating part) 28 of the connecting part. In other words, by forming the thin area 20 on the back surface of the semiconductor substrate 2, the position of the inside boundary 22 is set in a range in which there is no loss of functionality for the operating part 4 (i.e., in which the joining area with the member that transmits external forces, such as a connecting rod or the like, is retained, and no problems are created in terms of strength). The range for setting the inside boundary of the thin area can be expressed as the distance $W_2$ shown in FIG. 2. In this case, the distance $W_2$ may be set (for example) so that the condition $0\leq W_2<W_3$ is satisfied. Here, $0\leq W_2$ means that the position of the inside boundary 22 faces the edge of the inside end portion 28 of the connecting part, beginning with the external force application area as the starting point.

In this case, the outside boundary and inside boundary of the thin area are set so that these boundaries do not fall on the connecting parts. As a result of the positions of the boundaries of the thin area thus being set, an unnecessary concentration of stress in the boundaries between the thick parts and thin parts of the connecting parts can be avoided.

Furthermore, in the thin area 20, the non-deformation areas 4B, which are the four corner parts of the operating part 4, are not parts that have an effect on the measurement of axial forces in the thin area formed on the back surface of the operating part 4. Accordingly, a reduction in thickness is not always necessary, but such a reduction is still desirable to improve the alignment with the glass parts 25 and 26. By making the thin area large, it is possible to make the surface area of the joining surface (thick part) on the chip side smaller than the surface area of the joining surface on the side of the glass parts, and a tolerance can be obtained in the alignment of the two joining surfaces. In other words, it is necessary merely to make an adjustment so that the joining surface on the chip side is positioned inside the joining surfaces of the glass parts, and there is no need to take the alignment of the edges of the two joining surfaces into account. This makes it possible to design the area of the joining surface of the chip (the joining surface for which joining is originally desired) using only the conditions on the chip side. In other words, there is no need for severe consideration of the positions of grooves formed in the glass parts.

Next, a second embodiment of the thin area formed in the six-axis force sensor chip 1 will be described with reference to FIG. 4. FIG. 4 is a view similar to FIG. 2, and shows a simplification of the front surface of the semiconductor substrate 2 of the six-axis force sensor chip 1.

The thin area in this embodiment is formed as thin area portions 31 through 34, as shown by the hatched area in FIG. 4, in positions corresponding to the four connecting parts 5A through 5D, respectively. As in the case of the first embodiment, the thin area portions 31 through 34 are formed as divided individual areas by subjecting the back surface of the semiconductor substrate 2 to dry etching or the like.

Each of the four thin area portions 31 through 34 is formed so as to include the corresponding connecting parts 5A through 5D. The thin area portions 31 through 34 indicated by the hatched areas are formed as thin parts compared to the parts of other areas. In this embodiment as well, the respective boundaries of the thin area portions 31 through 34 are not formed in the connecting parts 5A through 5D, but are formed in the supporting part 3 and operating part 4.

The thin area portions 31 through 34 according to the present embodiment are set within a range in which there is a near match of the planar shapes that substantially include the connecting parts 5A through 5D. Accordingly, etching can be performed over a smaller surface area.

The thin area portions 31 through 34 shown in FIG. 4 are separated from each other, but these areas may also be formed so that both respective end portions of the thin area portions 31 through 34 are connected to the end portions of the adjacent thin areas.

Next, a modification of the second embodiment will be described with reference to FIG. 5. The front surface of the semiconductor substrate 2 of the six-axis force sensor chip 1 of this embodiment is shown in simplified form, and the location of the upper right corner part of the semiconductor substrate 2 shown in FIG. 4 is shown in a partial view.

Figure 5:
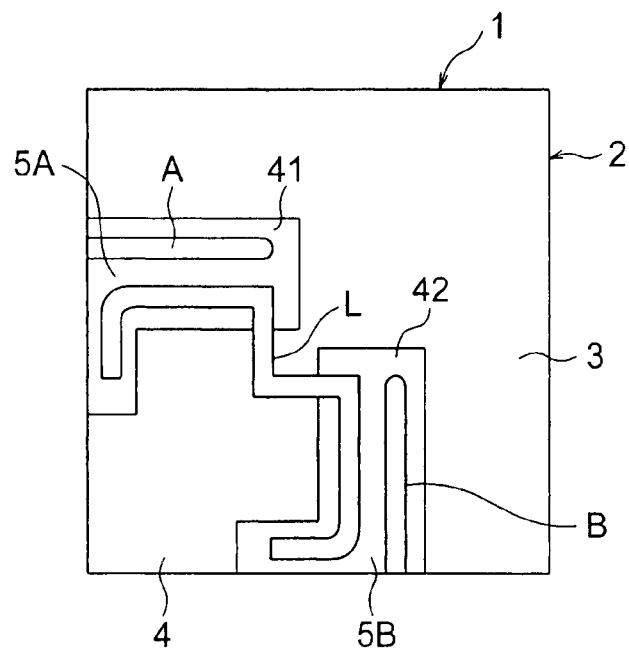
FIG. 5 is a top plan view showing essential parts of a modification of the force sensor chip according to the second embodiment.

The thin area in the present embodiment, for example, are formed as thin area portions 41 and 42 corresponding to the connecting parts 5A and 5B, respectively, and indicated as hatched areas in FIG. 5. As in the first and second embodiments, the thin area portions 41 and 42 are formed as divided individual areas by subjecting the back surface of the semiconductor substrate 2 to dry etching or the like.

The left half of the thin area 41 is omitted in FIG. 5, and the lower half of the thin area 42 is also omitted. The thin area portions 41 and 42 both have a T shape. The thin area portions 41 and 42 are formed so as to include the corresponding connecting parts 5A and 5B and the holes A, B, L, M and K, and are formed with the same shape as the connecting parts (or a similar shape) but with a larger surface area than the connecting T-shaped parts. The thin area portions 41 and 42 indicated as the hatched areas are formed as thin parts compared to the parts of other areas. In FIG. 5, the thin area portions 41 and 42 of the connecting parts 5A and 5B are shown; however, thin areas of the other connecting parts 5C and 5D are also similarly formed. In the present embodiment as well, the respective boundaries of the thin area portions 31 through 34 are not formed in the connecting parts 5A through 5D, but are formed in the supporting part 3 and operating part 4.

The thin areas in the present embodiment include the connecting parts 5A through 5D, and are formed so that these thin areas are considerably larger than the connecting parts. By reducing the thickness in such a shape, the surface area where thickness-reducing etching is performed can be reduced, and the design of the thin areas can be simplified.

Next, an example in which the force sensor of the six-axis force sensor chip 1 formed by the semiconductor substrate 2 having the shape described above is assembled with the sensor unit will be described with reference to FIGS. 6 and 7.

Figure 6:
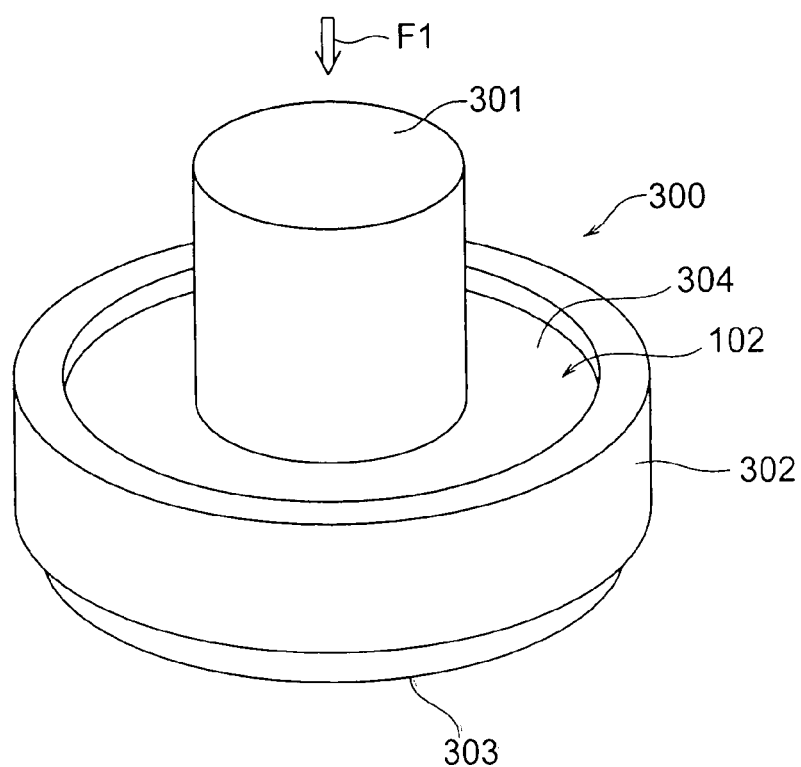
FIG. 6 is a perspective view showing an example of assembly of the force sensor chip with the sensor unit.
Figure 7:
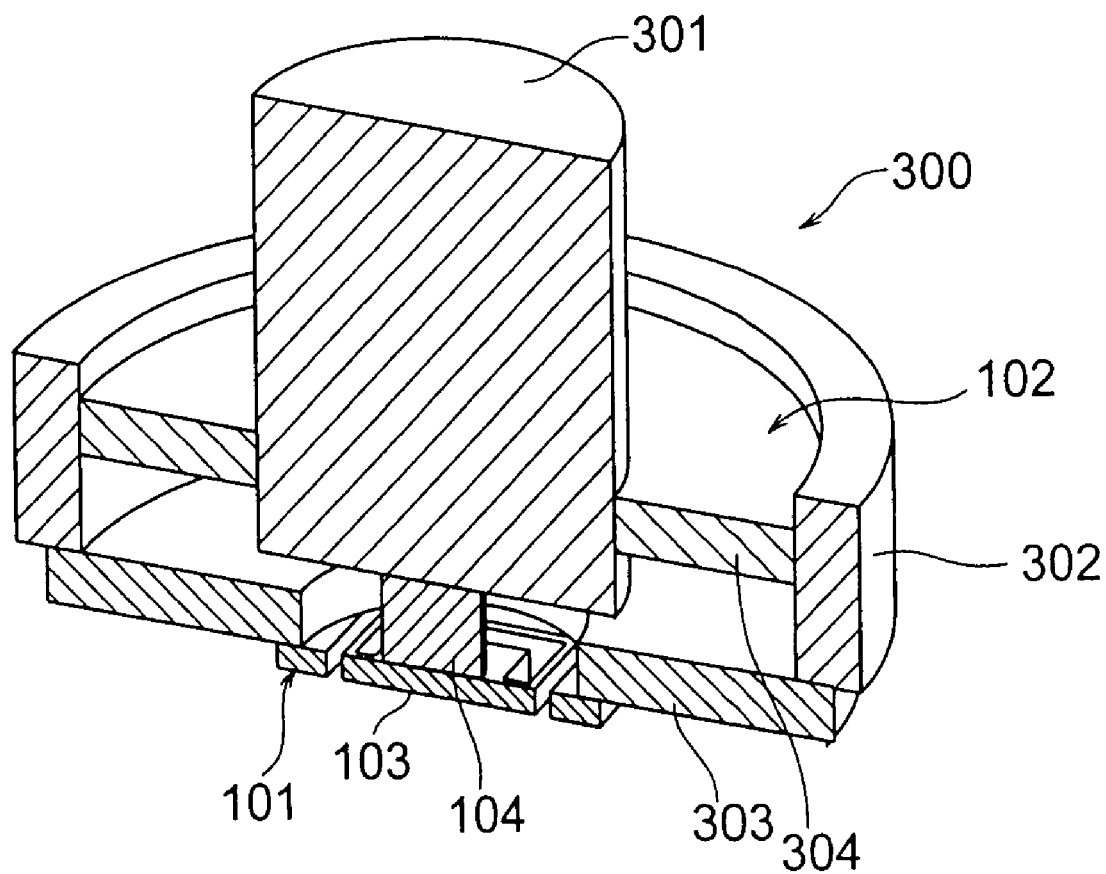
FIG. 7 is a longitudinal sectional view of the force sensor shown in FIG. 6.

FIG. 6 is a perspective view of the external appearance of the force sensor, and FIG. 7 is a sectional perspective view illustrating the internal structure of the force sensor.

The essential parts of a force sensor 300 are constructed from a force sensor chip 101 and a shock-absorbing device 102. The force sensor chip 101 is one of the force sensor chips 1 described in the embodiments. The force sensor 300 is constructed from a cylindrical rod-form input part 301 to which an external force (axial force or load) F1 is directly applied, a sensor mount 302 that has a relatively flat cylindrical shape (or ring shape) with a short length in the axial direction and is used to mount the force sensor 300 in a specified location, a discoid chip seat 303 that is used to attach the force sensor chip 101, a circular plate 304 having a damping or shock-absorbing function, and a transmission part 104 for connecting the input part 301 and the operating part 103 of the force sensor chip 101. The circular plate 304 forms the damping mechanism part of the shock-absorbing device 102 described above.

The circular plate 304 and the discoid chip seat 303 are disposed parallel to each other in relatively close positions. The circular plate 304 and chip seat 303 both have holes formed in the central part. Furthermore, in a position on the lower side (outside) of the chip seat 303, the back surface of the force sensor chip 101 is mounted via a glass part (not shown) to a part of the hole formed in the central part of the discoid chip seat 303. The rod-form transmission part 104 is disposed so that this part passes through the hole in the chip seat 303 and connects the undersurface of the input part 301 and the operating part 103 of the force sensor chip 101.

In the force sensor 300, the chip seat 303 and transmission part 104 are adjacent to each other on the same side of the force sensor chip 101. Furthermore, using a layout such as that of the damping device 102 shown in FIGS. 6 and 7 allows the entire construction of the damping device 102 to be located on the same side of the force sensor chip 101 (on the upper side of the force sensor chip 101 in FIG. 7), and the force sensor chip 101 can be joined by post-assembly after two or more of the parts comprising the input part 301, circular plate 304, sensor mount 302, transmission part 104 and chip seat 303 are integrally formed.

To reduce the thickness of the force sensor 300, the transmission part 104, damping mechanism part 304, and chip seat 303 are disposed on the side of the same surface of the force sensor chip 101; the damping mechanism part 304 is disposed on the inner circumferential side of the sensor mount 302; and the transmission part 104 is disposed on the inner circumferential side of the chip seat 303.

When an external force F1 is applied to the input part 301, the circular plate 304 is deformed by the external force F1, and this external force F1 is dampened and transmitted to the operating part 103 of the force sensor chip 101.

Obviously, various minor changes and modifications of the present invention are possible in light of the above teaching. It is therefore to be understood that within the scope of the appended claims the invention may be practiced otherwise than as specifically described.

What is claimed is:

1. A force sensor chip having a multiaxial force sensing function, comprising:
   a base member having an operating part provided with an external action area part, a supporting part for supporting the operating part, and connecting parts which connects the operating part and the supporting part, the base member having a top surface, a bottom surface and a thickness between the top surface and bottom surface; and
   strain resistance elements disposed in the connecting parts or within boundaries between the connecting parts and the operating part,
   wherein the base member has an area of reduced thickness, the area of reduced thickness is configured to include as a whole each of the connecting parts, and the area of reduced thickness has a first boundary disposed in the supporting part and a second boundary disposed in the operating part, the first boundary being neither disposed in said connecting part nor coincident with a junction between each said connecting part and the supporting part, the second boundary being neither disposed in each said connecting part nor coincident with a junction between each said connecting part and the operating part.

2. The force sensor chip of claim 1, wherein the first boundary of area of reduced thickness is disposed in an area of a predetermined range extending from outside end portions of the connecting parts to an end portion of the base member, and the second boundary of the area of reduced thickness is disposed in an area of a predetermined range extending from an end portion of the external force application area to inside end portions of the connecting parts.

3. The force sensor chip of claim 1, wherein the area of reduced thickness has a shape similar to a shape of each of the connecting parts.

4. The force sensor chip of claim 1, wherein the base member is bored to have openings that functionally separate the base member into the supporting part, the operating part and the connecting parts.

5. The force sensor chip of claim 4, wherein the openings are long slots.

6. The force sensor chip of claim 4, wherein each of the connecting parts has a bridge part provided with an area of high rigidity, and an elastic part provided with an area of low rigidity.

7. The force sensor chip of claim 6, wherein the first boundary of the area of reduced thickness is disposed inside an area of a predetermined range extending from an end portion of the base member to end portions of the elastic parts, and the second boundary of the area of reduced thickness is disposed inside an area of a predetermined range extending from an end portion of the external force application area to end portions of the bridge parts.

8. The force sensor chip of claim 1, wherein the area of reduced thickness is an annular area that surrounds the external force application area of the operating part.

9. The force sensor chip of claim 1, wherein the area of reduced thickness comprises a recess formed in the bottom surface of the base member.

10. The force sensor chip of claim 1, wherein the base member is a semiconductor substrate, and the area of reduced thickness is formed by a dry etching treatment.

11. The force sensor chip of claim 1, wherein the area of reduced thickness has a uniform thickness.

12. The force sensor chip of claim 11, wherein the area of reduced thickness comprises a recess in the bottom surface of the base member.

* * * * *